United States Patent
Poulin

(10) Patent No.: US 6,545,979 B1
(45) Date of Patent: Apr. 8, 2003

(54) ROUND TRIP DELAY MEASUREMENT

(75) Inventor: André Poulin, Hull (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/200,442

(22) Filed: Nov. 27, 1998

(51) Int. Cl.$^7$ .............................. H04L 12/26; H04J 3/14
(52) U.S. Cl. ..................... 370/241.1; 370/241; 370/248; 370/249; 370/250; 370/389; 370/395.1; 370/905; 709/224; 714/47
(58) Field of Search .............................. 370/241, 241.1, 370/248, 249, 250, 389, 395.1, 905; 709/223, 224; 714/1, 47

(56) References Cited

U.S. PATENT DOCUMENTS

| | | | | |
|---|---|---|---|---|
| 5,260,935 A | * | 11/1993 | Turner | 370/60 |
| 5,339,311 A | * | 8/1994 | Turner | 370/60 |
| 5,471,631 A | * | 11/1995 | Beardsley et al. | 395/650 |
| 5,483,523 A | * | 1/1996 | Nederlof | 370/58.3 |
| 5,521,907 A | * | 5/1996 | Ennis, Jr. et al. | 370/17 |
| 5,793,976 A | * | 8/1998 | Chen et al. | 395/200.54 |
| 5,812,528 A | * | 9/1998 | VanDervort | 370/235 |
| 6,023,455 A | * | 2/2000 | Takahashi | 370/249 |
| 6,097,699 A | * | 8/2000 | Chen et al. | 370/231 |

OTHER PUBLICATIONS

ITU–T I.610, Integrated Services Digital Network (ISDN), Maintenance Principles, "B–ISDN Operation and Maintenance Principles and Functions", 11/95.
The ATM Forum Technical Committee, Traffic Management Specification, Version 4.0, Apr. 1996.
ITU–T I.356, Series I: Integrated Services Digital Network, Overall network aspects and funtions—Performance objectives, "B–ISDN ATM layer cell transfer performance", 10/96.
ITU–T, O.191, Series O: Specifications of Measuring Equipment, Equipment for the measurement of digital and analogue/digital parameters, "Equipment to access ATM layer cell transfer performance", 04/97.

* cited by examiner

Primary Examiner—Hassan Kizou
Assistant Examiner—Joe Logsdon
(74) Attorney, Agent, or Firm—Marks & Clerk

(57) ABSTRACT

A system and method for calculating round trip delay (RTD) values in a switched digital network such as an asynchronous transfer mode (ATM) network. A loopback cell such as an ATM operation and maintenance (OAM) cell is used to carry a delta value through the network. The delta value, which represents a processing interval at a loopback node or an intermediate node, is calculated utilizing timestamps generated at specific ingress and egress ports of network nodes. Cell Transfer Delay (CTD) and Cell Delay Variations (CDV) values are calculated based on the measured RTD.

10 Claims, 4 Drawing Sheets

| Byte | CONTENT |
|---|---|
| 1 | ATM HEADER Byte 1 |
| 2 | ATM HEADER Byte 2 |
| 3 | ATM HEADER Byte 3 |
| 4 | ATM HEADER Byte 4 |
| 5 | ATM HEADER Byte 5 |
| 6 | OAM Cell Type \| OAM Function Type |
| 7 | Loopback indication bit |
| 8 | Correlation Tag Byte 1 |
| 9 | Correlation Tag Byte 2 |
| 10 | Correlation Tag Byte 3 |
| 11 | Correlation Tag Byte 4 |
| 11 | Loopback Location ID (optional) Byte 1 |
| 12 | Loopback Location ID (optional) Byte 2 |
| 13 | Loopback Location ID (optional) Byte 3 |
| 14 | Loopback Location ID (optional) Byte 4 |
| 15 | Loopback Location ID (optional) Byte 5 |
| 16 | Loopback Location ID (optional) Byte 6 |
| 17 | Loopback Location ID (optional) Byte 7 |
| 18 | Loopback Location ID (optional) Byte 8 |
| 19 | Loopback Location ID (optional) Byte 9 |
| 20 | Loopback Location ID (optional) Byte 10 |
| 212 | Loopback Location ID (optional) Byte 11 |
| 23 | Loopback Location ID (optional) Byte 12 |
| 24 | Loopback Location ID (optional) Byte 13 |
| 25 | Loopback Location ID (optional) Byte 14 |
| 26 | Loopback Location ID (optional) Byte 15 |
| 27 | Loopback Location ID (optional) Byte 16 |
| 28 | Source ID (optional) Byte 1 |
| 29 | Source ID (optional) Byte 2 |
| 30 | Source ID (optional) Byte 3 |
| 31 | Source ID (optional) Byte 4 |
| 32 | Source ID (optional) Byte 5 |
| 33 | Source ID (optional) Byte 6 |
| 34 | Source ID (optional) Byte 7 |
| 35 | Source ID (optional) Byte 8 |
| 36 | Source ID (optional) Byte 9 |
| 37 | Source ID (optional) Byte 10 |
| 38 | Source ID (optional) Byte 11 |
| 39 | Source ID (optional) Byte 12 |
| 40 | Source ID (optional) Byte 13 |
| 41 | Source ID (optional) Byte 14 |
| 42 | Source ID (optional) Byte 15 |
| 43 | Source ID (optional) Byte 16 |
| 44 | Unused (6AH) byte 1 for conventional OAM loopback cells---$t_3$ byte 1 for RTD loopback cell |
| 45 | Unused (6AH) Byte 2 for conventional OAM loopback cells---$t_3$ byte 2 for RTD loopback cell |
| 46 | Unused (6AH) Byte 3 for conventional OAM loopback cells---$t_3$ byte 3 for RTD loopback cell |
| 47 | Unused (6AH) Byte 4 for conventional OAM loopback cells---$t_3$ byte 4 for RTD loopback cell |
| 48 | Unused (6AH) Byte 5 for conventional OAM loopback cells----- Unused (6AH) Byte 1 for RTD loopback cell |
| 49 | Unused (6AH) Byte 6 for conventional OAM loopback cells----- Unused (6AH) Byte 2 for RTD loopback cell |
| 50 | Unused (6AH) Byte 7 for conventional OAM loopback cells----- Unused (6AH) Byte 3 for RTD loopback cell |
| 51 | Unused (6AH) Byte 8 for conventional OAM loopback cells----- Unused (6AH) Byte 4 for RTD loopback cell |
| 52 | CRC-10 Byte 1 |
| 53 | CRC-10 Byte 2 |

FIG. 2

ROUND TRIP DELAY MEASUREMENT

FIELD OF THE INVENTION

This invention relates to packet and cell switched digital networks and more particularly to a system and method for determining the time interval associated with processing a cell at a network node and for calculating the round trip delay characteristics of traffic between end systems employing a time stamp insertion technique.

BACKGROUND

Packet switching systems, such as asynchronous transfer mode (ATM), typically rely on switching nodes within a network to transport digital traffic from a source to a destination or from end system to end system. Such systems are frequently operated by service providers who undertake to deliver digital traffic in accordance with a negotiated service agreement. In order to evaluate quality of service (QoS) performance it is frequently desirable to monitor certain service related criteria such as cell transfer delay (CTD) and cell delay variations (CDV). This requires that there be an accurate evaluation of the times involved in transporting data traffic through the network. Typically, delays can occur in the network at the physical layer, at the switching layer or through queuing at switching nodes.

One know solution to measuring delays in digital traffic relates to ATM systems in which Performance Monitoring (PM) cells are used to calculate Cell Delay Variations (CDVs). The known techniques for CDV calculations based on PM cells, however, require that the measuring points (MPs) have a synchronized clock. In any event, the reliability of PM cells to measure delay is still under study.

The ATM Forum Traffic Management Specification version 4.0 includes reference to a loopback cell for use in monitoring specific system parameters. This loopback cell, known herein as an Operations and Maintenance (OAM) cell, is transmitted, on demand, by one of the end systems, e.g. the source, through the various intermediate switching elements in the network to the opposite end system, e.g. the destination, and reports back to the source with relevant information. This information includes on-demand connectivity status, instances of fault detection and in the event of a fault detection, information on the fault location, and pre-service connectivity verification. An OAM cell, in an ATM environment has a fixed length of 53 bytes including a 5 byte header as will be discussed in greater detail later. Advantageously, there are byte location assignments in an OAM cell that have not heretofore been used. In accordance with the present invention these previously unassigned byte locations are used for on-demand round trip delay measurement information.

SUMMARY OF THE INVENTION

Accordingly, the present invention provides a method and system for determining the Round Trip Delay (RTD) value which can be used to calculate CTD and CDV. The method and system makes use of the aforementioned loopback OAM cell in the measuring of cell transfer delay in a round trip fashion and to record times required to process cells at network elements. The system and method employ the concept of time stamps. Advantageously, implementation of the invention does not require a synchronization clock.

Therefore in accordance with a first aspect of the present invention there is provided in a packet switched digital network having at least one network element a system for calculating processing intervals at the network element comprising: first means to detect an arrival of a selected packet at the element; first timing means to generate a first time stamp upon detecting the arrival of the packet; second means to note the instance of sending the selected packet from the element; second timing means to generate a second time stamp upon detecting the sending; and means to obtain a processing interval by subtracting the first time stamp from the second time stamp.

In a preferred embodiment of this aspect of the invention the selected cell is a loopback OAM cell which is transmitted, on demand, by an end system through the network and back to the end system.

In this preferred embodiment the network element records the processing interval also known as the delta value in the OAM cell. It is within the scope of the present invention for the OAM cell to record accumulated delta values occurring due to the OAM cell being processed by a number of network elements.

In accordance with a second aspect of the invention there is provided a method of determining a processing interval of a cell at a network element in a packet switched digital network. The method comprises: recording a first time stamp upon arrival of a selected cell at the network element; recording a second time stamp upon sending the selected cell from the element; and obtaining a process interval or delta value by subtracting the value of the first time stamp from the value of the second time stamp.

The present invention also contemplates the calculation of a round trip delay wherein a time stamp is attached to a loopback OAM cell upon being sent from a source, a second time stamp is generated upon arrival at a destination, a third time stamp is generated upon the cell being returned by the destination and a fourth time stamp is generated upon receipt at the source. The delta value, which is the difference between the third time stamp and the second time stamp, is calculated at the destination and recorded in the OAM cell. At the source the round trip delay is determined by subtracting the first time stamp from the fourth time stamp and then subtracting therefrom the delta value.

Therefore, in accordance with a third aspect of the present invention there is provided a method of determining the round trip delay of digital traffic from a source node to a termination node and back to the source through a switched digital network, the method comprising: recording a first time stamp when a selected cell is transmitter by the source node; recording a second time stamp upon receipt of the cell by the termination node; recording a third time stamp when the cell is returned by the termination node; calculating delta by subtracting the second time stamp from the third time stamp; marking the selected cell with the delta value; recording a fourth time stamp upon receipt of the cell by the source node; and determining the round trip delay by subtracting the first time stamp from the fourth time stamp and subtracting delta from the result.

In a preferred embodiment of this aspect the selected cell is an OAM cell. Further, interrupt means are preferably used by the termination node and/or the source node to detect the arrival of the OAM cell.

According to a further aspect of the invention there is provided a system for determining the round trip delay of digital traffic between a source node and a termination node in a switched digital network, the system comprising: first means to record a first time stamp upon transmission of a selected cell by the source node; second means to record a second time stamp upon receipt of the selected cell by the termination node; third means to record a third time stamp and to calculate a delta value by subtracting the second time stamp from the third time stamp; marking means to mark the selected cell with the delta value; fourth means to record a fourth time stamp upon receipt of the selected cell by the source node; and means to calculate the round trip delay by subtracting the first time stamp from the fourth time stamp and subtracting the delta value from the remainder.

In a preferred embodiment of this aspect of the invention the source node and/or termination nodes include interrupt means to ensure prompt detection of the arrival of the selected cell. The selected cell is preferably an OAM cell.

BRIEF DESCRIPTION OF THE DRAWINGS

The invention will now be described in greater detail with reference to the attached drawings wherein:

FIG. 2 shows a loopback cell structure according to the invention;

DETAILED DESCRIPTION OF THE INVENTION

In constant bit rate (CBR) ATM traffic used for telephony purposes, the service contract will typically specify that the one way delay must be smaller than 30 msec in order for the system to work without an echo cancellation device. One method of determining the one way delay is to use the round trip delay which in this example involves measuring the total time it takes for cells to go to the far end and come back. Assuming that the delay in a downstream connection is equal to the delay in an upstream connection, then the one way delay can be obtained by dividing the RTD by 2. In the above example, the one way delay would, in most cases, be smaller than 30 msec anyway.

Figure 1:
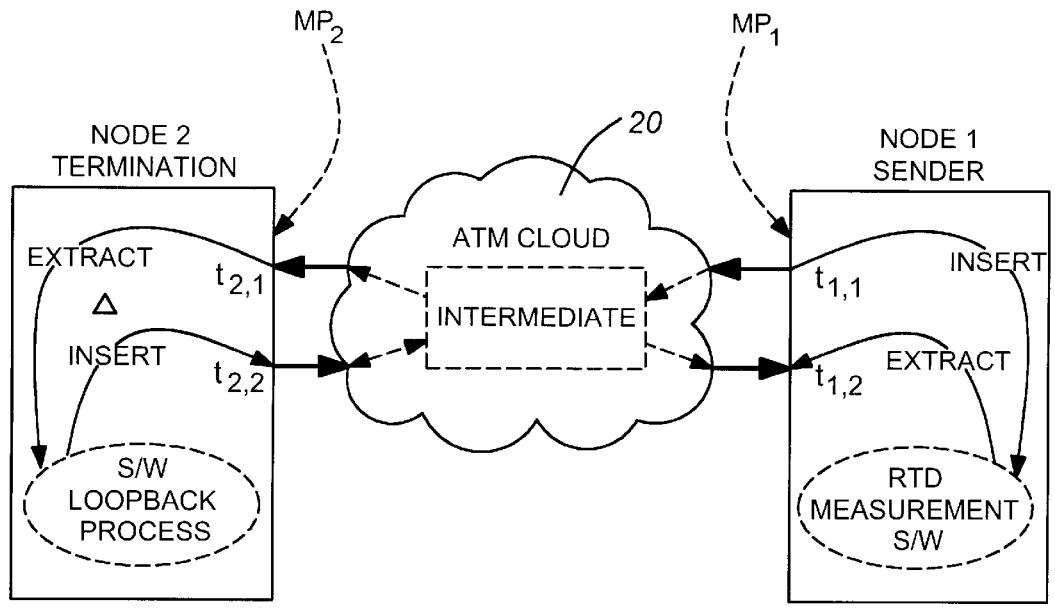
FIG. 1 is a high level diagram of a sender node and a termination node showing round trip delay measurement parameters.

In the present invention the round trip delay is calculated by measuring the time it takes for a designated cell to travel between end systems including time spent at intermediate nodes. The round trip delay value will typically include all queuing, switching and routing delays from the one end system, e.g. the sending node, to the other end system, e.g. termination node, and then from the termination node back to the sending node. In FIG. 1 this includes delays from $MP_1$ to $MP_2$ and then from $MP_2$ to $MP_1$. In this example any delay before $MP_1$ and after $MP_2$ is not included in the Round Trip Delay calculation. Thus at node 2, any software (or hardware) introduced delay is not part of the Round Trip Delay and must be excluded from the equation. As will be discussed later the designated cell, also known as a round trip delay cell, takes a different path, particularly at the termination node, than does a user data cell and therefore will require special consideration. Node 2 will need to calculate how much time was spent by software (and hardware if not negligible) for the processing of the round trip delay cell and must have a way to tell Node 1 about this time.

The solution is to calculate and send back in the designated or special cell the time spent by the software and/or hardware in the termination node to process the cell. For the purpose of this calculation the present invention relies on timestamps which are recorded in the cell at specific points in the system.

The specific or designated cell identified above and used in the present invention is a standard OAM loopback cell. In FIG. 1 an OAM cell is launched from the point where the RTD is calculated (node 1), traverses one or more intermediate ATM switches 20 and is received by the terminating point (node 2).

The terminating point (node 2) then processes that cell and returns it back to the sender (node 1) with the indication bit flipped (telling the sender that this cell was well received and sent back). Since the terminating point took some time to process that cell, that processing interval is inserted in the OAM loopback cell (to be described later with reference to FIG. 2) before it is sent back.

The original sender of the cell then receives the cell, with the delay introduced by the terminating point, and can then calculate the time it took for the cell to leave and come back, excluding the processing time at the looping end.

The purpose of the RTD is to calculate the time spent by a cell in the ATM network (physical layer, switching layer, queuing, etc..) and not the time for the cell to be looped back at the terminating point. This is the reason for the introduction of processing time or a delta value in a standard OAM loopback cell by the present invention.

In order to be able to measure the RTD, a standard F4 (VP) or F5 (VC) OAM loopback cell is used. This standard OAM loopback cell is currently used in most available ATM switches and is used to verify connectivity at setup time or in service. It is also used for fault localization when a connection is failing. An additional purpose for the OAM cell, as introduce by the present invention, is for the insertion of the delta value for round trip delay calculation purposes. The round trip delay is calculated with the help of time stamping and the aforementioned delta value.

FIG. 2 illustrates the structure of the OAM loopback cell. At present this type of cell has 8 octets that are unused. Unused OAM cell information field octets are coded as 0X6A. The unused octet fields are, typically, not checked by the receiver of an OAM cell, thus providing the ability to enhance those OAM cells. Backward compatibility is thus preserved because node elements which do not support the RTD measurement will process the cell normally i.e. the cell is not discarded simply because the Hex values 0X6A were not found in the unused octets. For example, if Node 2 (FIG. 1) receives an OAM loopback cell from an originating node (e.g. Node 1) which does not support RTD calculations, Node 2 would still introduce the delta value in the returning cell and Node 1, upon receipt of the returning cell, would still consider the cell to be valid. In other words, even if a delta value is in the cell, Node 1 will process the cell as a standard OAM loopback cell.

The RTD measurement according to the invention uses the first four unused octets (Byte no. 44,45,46 and 47) of a standard OAM loopback cell structure as can be seen in FIG. 2. Those four bytes will be used to store a "delta value" which was inserted by the termination point at $MP_2$. The "delta value" is referred to as $t_3$ in this document.

The resolution of all time stamps and for the delta value is in $\mu$sec. For the delta value (32 bit), the valid range will be 0 to 0X6A6A6A69 because of the 0X6A6A6A6A value found in a standard OAM loopback cell. This means that if the value 0X6A6A6A6A is received in the delta value the looping end does not support RTD measurements.

Conventionally, if an OAM loopback cell is not returned to the sender node within five seconds from the send time, it is considered lost. This gives a practical limit to the delta value of five seconds. Thus the valid range for $t_3$ (delta value) is 0 to 5 seconds. Although five seconds could have fit in a 3 byte value, 4 bytes are used in the preferred embodiment because it is handled more easily by control processors and it is also expandable.

Using a standard OAM F4 and F5 type of cell for calculating the round trip delay value gives a method of performing a totally non-intrusive measurement. OAM RTD cells will not be sent more than one cell per five seconds to follow the OAM loopback standards and thus does not affect the bandwidth needed.

Using FIG. 1 the round trip delay measurement time stamping process will now be described in more detail. FIG. 1 shows the overall setup of a connection. The connection can be a VP (F4) or VC (F5) level connection.

Sequence of events:
1) Node 1 receives a request to measure the round trip delay on a specific connection. The entity at point $MP_1$ takes a first time stamp ($t_{1,1}$) just before transmitting the OAM loopback cell towards the ATM cloud.
2) The cell travels through the ATM cloud and arrives at point $MP_2$. Point $MP_2$ takes a second time stamp ($t_{2,1}$) when the OAM loopback cell arrives (this process may be interrupt driven to improve accuracy in the measurement process).
3) At Node 2, software and/or hardware processes the OAM loopback cell, and takes a third time stamp ($t_{2,2}$) just before sending back the cell. Now the delta value will be calculated in the following fashion.

$$\text{Delta } (t_3) = t_{2,2} - t_{2,1}$$

The delta value is put in the first four unused bytes of the cell shown in FIG. 2 to be returned to node 1. The cell travels back through the ATM cloud towards Node 1 and arrives at point $MP_1$. Point $MP_1$ takes a fourth time stamp ($t_{1,2}$) when the OAM loopback cell arrives (this process is again preferably interrupt driven for better accuracy in the measurement process). The total Round Trip Delay can now be calculated at Node 1 as follows:

round trip delay=(Time when the cell was received)−(Time when the cell was sent)−Delta value i.e., $RTD = t_{1,2} - t_{1,1} - t_3$ ITU-T Recommendation I.356 "B-ISDN ATM Layer Cell Transfer Performance", October 1996 provides details on how both CDV and CTD are calculated utilizing the RTD value.

Figure 3:
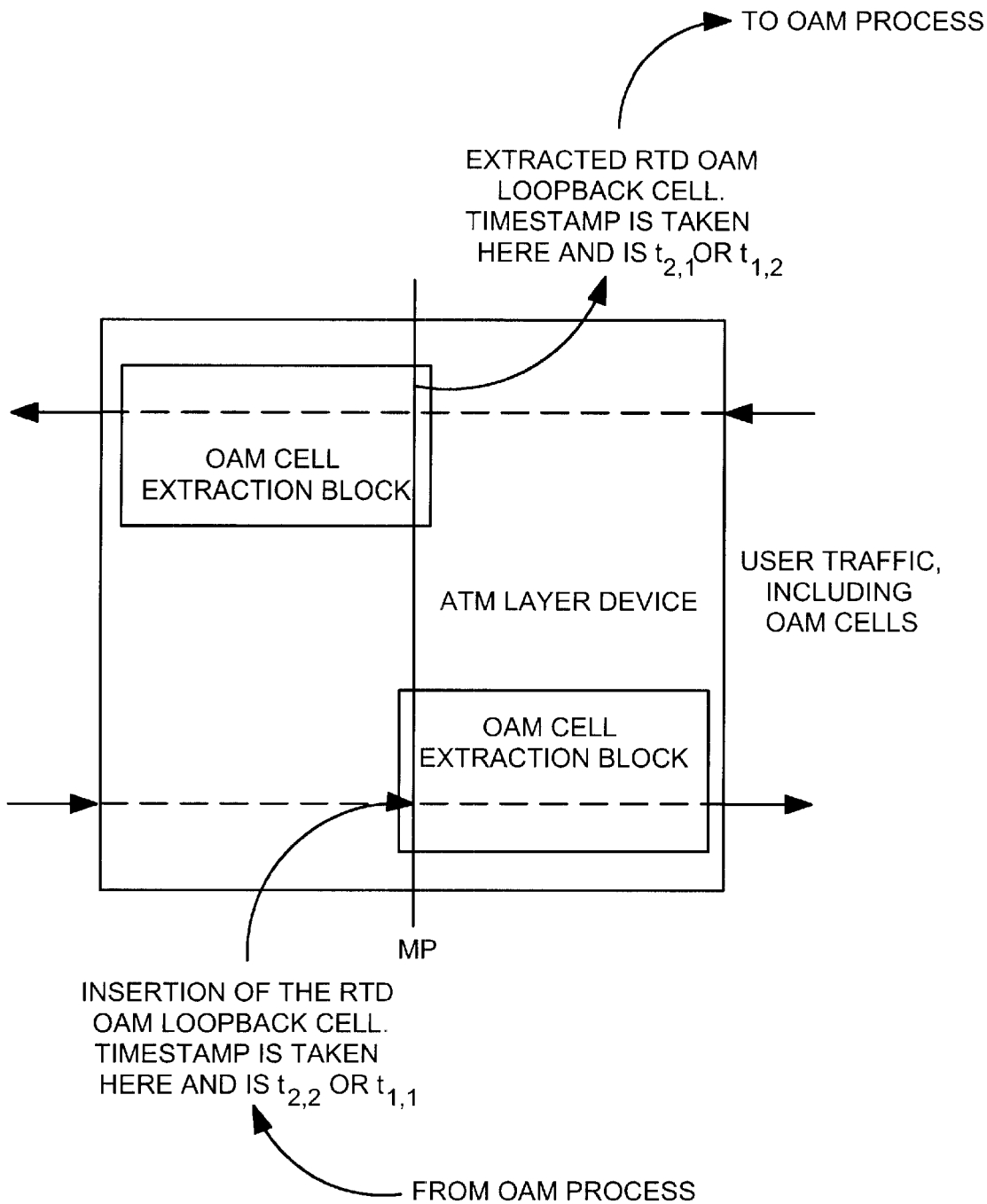
FIG. 3 illustrates an OAM cell flow at the ATM device layer.

FIG. 3 illustrates the OAM cell flow at the ATM device layer. This is a general, simplified block diagram of an ATM device layer used to extract and insert OAM cells. All cells going through this device are verified and OAM cells marked to be extracted are put aside and the control processor is notified by an interrupt sequence. The control processor then takes a time stamp and extracts the cell. OAM cells to be inserted in the device are copied to the device and the device is then triggered to send the cell.

Depending on location i.e., Node 1 or Node 2, different processing is performed. If at Node 1, then a time stamp is taken when the cell is sent and when the cell is received. Those time stamps are stored away for final calculation of RTD. If at Node 2, a time stamp is taken when the cell is received. When the cell is ready to be transmitted, a second time stamp is taken and the delta value is calculated and inserted in the cell. The cell is then transmitted.

Figure 4:
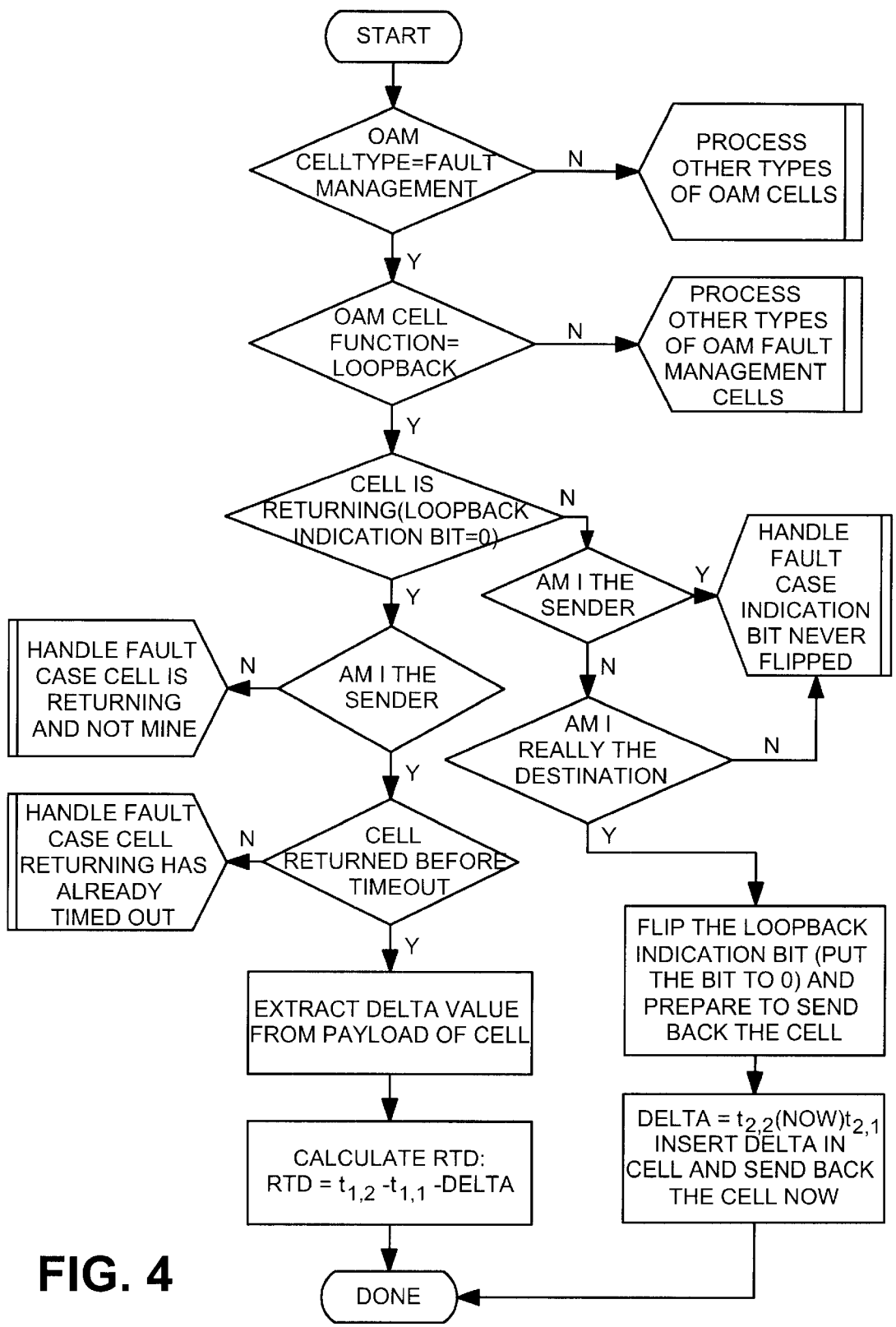
FIG. 4 is a flow diagram of the processing of an OAM loopback cell with RTD calculations.

FIG. 4 shows a flow chart of the processing of an OAM Loopback cell. This flowchart is simplified and only illustrates the case of a loopback cell with an included RTD delta value.

As the OAM Loopback cell is propagated on a specific virtual connection (VC) or virtual path (VP) through the ATM network in the forward and return directions, various switching nodes traversed by the OAM cell may cause it to deviate from the VC for internal processing purposes. In other words, the OAM cell may not follow the same VC or VP route as typical data cells within the ATM switch. This deviation from the internal data path might introduce unwanted delays in the round trip time that is being measured.

Thus, as an alternative, the OAM Loopback cell can carry a cumulative delay delta and any switching node that causes the OAM cell to deviate from the internal path followed by data cells for the particular VC or VP adds its computed delta to the value already in the OAM Loopback cell. The RTD measurement in this embodiment is computed at the source node in the same fashion as described above.

Figure 5:
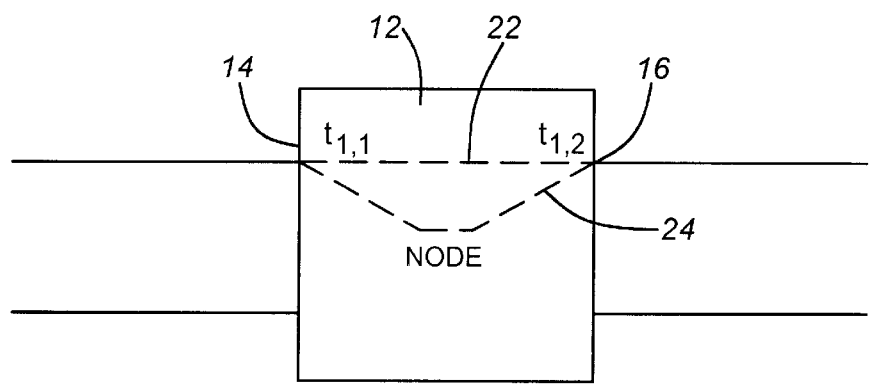
FIG. 5 shows an intermediate switching node illustrating different paths for OAM cells and user data cells with receive and send time stamp indications for OAM cells.

FIG. 5 represents such an intermediate switching element or node 12 in a network environment. Each such element has an ingress port 14 and an egress port 16. Within the element, user data cells may be routed on a different VC or VP than the OAM loopback cell. This is shown in FIG. 5 by the two paths 22 and 24 respectively. Thus, when an OAM cell takes a different route than user data cells through a switching node the processing interval in that node needs to be considered. In accordance with the present invention a first time stamp $t_{1,1}$ is generated upon an OAM cell arriving at a switching node and a second time stamp $t_{1,2}$ is generated upon sending of the OAM cell from the node. The difference between the first time stamp and the second time stamp is the processing interval and is marked in the OAM cell for use in determining time related information such as round trip delay.

While certain specific embodiments of the invention have been described and illustrated it will be apparent to one skilled in the art, to which the invention pertains, that numerous alternatives and/or variations can be implemented without departing from the basic concept. It is to be understood, however, that such alternatives and/or variations will fall within the full scope of the invention as defined by the appended claims.

What is claimed is:

1. A system for calculating a processing interval at a network element in a packet switched digital network, said system comprising: first detection means at an ingress port of said network element to detect an arrival of a designated loopback cell; first timing means to generate a first time stamp value upon detecting the arrival of the designated loopback cell; second detection means at an egress port of said network element to detect the sending of said designated loopback cell from said network element; second timing means to generate a second time stamp value upon detection of the sending of the designated loopback cell; and processing means to calculate a processing interval by subtracting said first dime stamp value from said second time value, and to store said processing interval in said designated loopback cell for transmission to a downstream network element, the calculation of said processing internal being independent of a network synchronization clock.

2. A system as defined in claim 1 wherein said switched digital network is an asynchronous transfer mode (ATM) network.

3. A system as defined in claim 2 wherein said loopback cell is an ATM operations and maintenance (OAM) cell.

4. A system as defined in claim 3 having interupt means to detect the arrival of said designated packet.

5. A method of determining a processing interval of a designated loopback cell at a network clement in a packet switched digital network, the method comprising: recording a first time stamp upon arrival of said designated loopback cell at said network element; recording a second time stamp upon sending said designated loopback cell from said network element; obtaining a process interval by subtracting the value of said first time stamp from the value of said second time stamp; and storing the processing interval in said designated loopback cell for transmission to a downstream network element, the processing interval being obtained independent of a network synchronization clock.

6. A method of calculating a round trip delay between a sending node and a termination node in a communications system employing a loopback OAM cell, said method comprising: recording a first time stamp when said loopback OAM cell is sent from said sending node, recording a second time stamp upon arrival of said loopback OAM cell at said termination node, recording a third time stamp upon said loopback OAM cell being sent back by said termination node and recording a fourth time stamp upon receipt of said loopback OAM cell at said sending node source; calculating a delta value by subtracting said second time stamp from said third time stamp; storing said delta value in said loopback OAM cell for transmission to said termination node and, calculating said round trip delay by subtracting said first time stamp from said fourth time stamp and subtracting said stored delta value from the remainder, said delta value being calculated independent of a network synchronization clock.

7. The method as defined in claim 6 wherein said round trip delay is used to calculate a cell delay variation (CDV) respecting traffic in said digital network.

8. The method as defied in claim 6 wherein said round trip delay value is used to calculate cell transfer delay (CTD) respecting traffic in said digital network.

9. A system for calculating cell transfer delay (CTD) in an asynchronous transfer mode (ATM) communications network utilizing a round trip delay (RTC) value respecting an Operations and Maintenance (OAM) loopback cell sent from a sender node to a termination node and returned to said sender node, said system comprising: a first timing means at said sender node for recording a first time stamp representing transmission time of said OAM cell; a second timing means at said termination node for recording a second time stamp representing receipt of said OAM cell; a third timing means at said termination node for recording a third time stamp representing retransmission of said OAM cell toward said sender node; delta calculating means in said termination node for calculating a processing interval at said termination node by subtracting said second time stamp from said third time stamp; means at said termination node for storing said calculated processing interval in said OAM cell; fourth timing means at said sender node for recording a fourth time stamp representing receipt of said OAM cell by said sender node; calculating means for determining round trip delay value by subtracting said first time stamp from said fourth time stamp and subtracting said stored processing interval from said remainder; and means to calculate CTD utilizing said RTD value, said round trip delay value being calculated independent of a network synchronization clock.

10. A system as defined in claim 9 further including means to calculate cell delay variation (CDV) utilizing said RTD value.

* * * * *